Patented Mar. 17, 1942

2,276,304

UNITED STATES PATENT OFFICE 2,276,304

COMPOSITION OF MATTER

James H. Hunter, Lansdowne, Pa., assignor to Radio Corporation of America, a corporation of Delaware No Drawing. Application June 30, 1938, Serial No. 216,828

2 Claims. (Cl. 106—152)

This invention relates to a novel composition of matter, and more particularly to a synthetic plastic composition.

Among the many plastic materials which have been made available for various articles of commerce is one known commercially as "Vinsol." This is a synthetic resin which is an extract from long leaf yellow pine tree stumps. In preparing the "Vinsol" resin, the stumps are disintegrated or shredded and the shredded material is extracted in large heated cylinders by means of a solvent such as benzol or some other suitable aromatic-hydrocarbon. The solvent extracts the "Vinsol" resin along with the rosin, turpentine, pine oil and miscellaneous other materials from the shredded stumps, after which the liquid is subjected to a distillation process. In the distilling cycle, the solvent is the first material to be removed, followed by the turpentine and finally the pine oil, a residue consisting of rosin and "Vinsol" remaining in the still. The molten resin is then run into a hot mixture of gasolene and furfural, and the rosin dissolves in the gasolene while the "Vinsol" dissolves in the furfural. The mixture is then allowed to stand and settle until two liquid layers have formed, one consisting of gasolene and rosin, and the other consisting of "Vinsol" and furfural. The latter layer is then run through a continuous still whereby the furfural is removed, and the "Vinsol" resin comes out in a hot molten state, being run into sheet metal containers and distributed therein in the market. The exact chemical composition of the "Vinsol" resin is not definitely known. It has been ascertained, however, that the "Vinsol" resin consists essentially of a highly oxidized form of abietic acid, and much smaller proportions of resin acids, poly-phenols, ligneous materials, and unoxidized abietic acid.

As supplied at present to the market, the "Vinsol" resin is extremely brittle and of practically little, if any, value when considered as a molding or casting material, unless it is compounded with other suitable materials, and the primary object of my present invention is to provide a novel composition of matter having a "Vinsol" resin base and which is suitable for use as a molding or casting material.

More particularly, it is an object of my present invention to provide a "Vinsol" resin composition as aforesaid wherein the melting point of the resin is raised and the strength, toughness, and impact strength thereof are increased.

It is also an object of my invention to provide a novel composition of matter as aforesaid which will have utility in many fields and which will be inexpensive in cost and highly efficient in use.

My present invention is based upon the discovery that the "Vinsol" resin is a very good solvent for corn protein and that corn protein imparts to it the characteristics of strength and toughness, as well as raising the melting point thereof in vary degrees, depending upon the amount of corn protein incorporated into the "Vinsol" resin. As illustrative of one formula according to my present invention, I may mix twenty-five pounds of corn protein derived, for example, by treating with alcohol the gluten meal residue remaining after treating corn to remove the starch and oil therefrom, and seventy-five pounds of "Vinsol" resin obtained as described above. The mixture may be made by melting the "Vinsol" resin and then adding the corn protein to the melting resin while stirring. The resulting composition may be used, for example, as a coating material for many articles, such as radio capacitors, transformers, paper tubes, etc.

Moreover, the novel composition above described may be incorporated in certain natural resins, such as shellac, as disclosed in my co-pending application Serial No. 211,082, filed May 31, 1938, to provide suitable molding compounds. Also, if desired, various plasticizers, such as castor oil, tri-phenyl-phosphate and the like, may be added to the improved composition forming the subject matter of my present invention, as may also various fillers, such as clay, rouge, calcium carbonate, and other metallic oxides and carbonates. Suitable dyes and pigments may also be included where necessary.

I claim as my invention:

1. A composition of matter comprising a resinous extract derived from long leaf yellow pine trees, said extract consisting essentially of oxidized abietic acid and having corn protein dissolved therein.

2. A composition of matter comprising a resinous extract derived from long leaf yellow pine trees, said extract comprising essentially a highly oxidized abietic acid and having corn protein dissolved therein.

JAMES H. HUNTER.